United States Patent [19]

Chapman

[11] 4,109,678
[45] Aug. 29, 1978

[54] FLUID CONTROL VALVE ASSEMBLY

[76] Inventor: Leonard Chapman, 13760 Chandler Blvd., Van Nuys, Calif. 91401

[21] Appl. No.: 771,961

[22] Filed: Feb. 25, 1977

[51] Int. Cl.$^2$ .............................................. F15B 13/04
[52] U.S. Cl. .................................. 137/596.2; 91/457; 137/636; 251/118; 251/240
[58] Field of Search ............... 91/454, 457; 137/596.2, 137/636, 868, 884; 251/118, 240, 245

[56] References Cited

U.S. PATENT DOCUMENTS

| | | | |
|---|---|---|---|
| 1,956,775 | 5/1934 | Ross | 137/636.1 |
| 3,838,710 | 10/1974 | Reip | 91/454 X |

*Primary Examiner*—Gerald A. Michalsky
*Attorney, Agent, or Firm*—Julian J. Schamus

[57] ABSTRACT

A fluid control valve assembly comprises a pair of identical valves mounted on a manifold with connections to the controlled actuator and to the high and low pressure sides of a fluid circuit incorporating a pump or other source of high-pressure fluid. Each valve includes a reciprocating tappet directly connected to a conical valve head and spring biased into a closed position of the valve, with a portion of the tappet protruding from the valve body. Superimposed on the two protruding tappets is a rocking beam which may be pivoted into contact with either tappet by means of a handwheel engaged in a bracket. A threaded shaft affixed to the handwheel passes through a nut pivotally secured to the rocking beam, so that rotation of the handwheel in either sense will result in the depression of one of the two valve tappets and the opening of the valve associated therewith. One valve is connected to the manifold to supply pressurized fluid to the actuator; the other valve is connected to a fluid sump to permit the discharge of fluid from the actuator.

9 Claims, 5 Drawing Figures

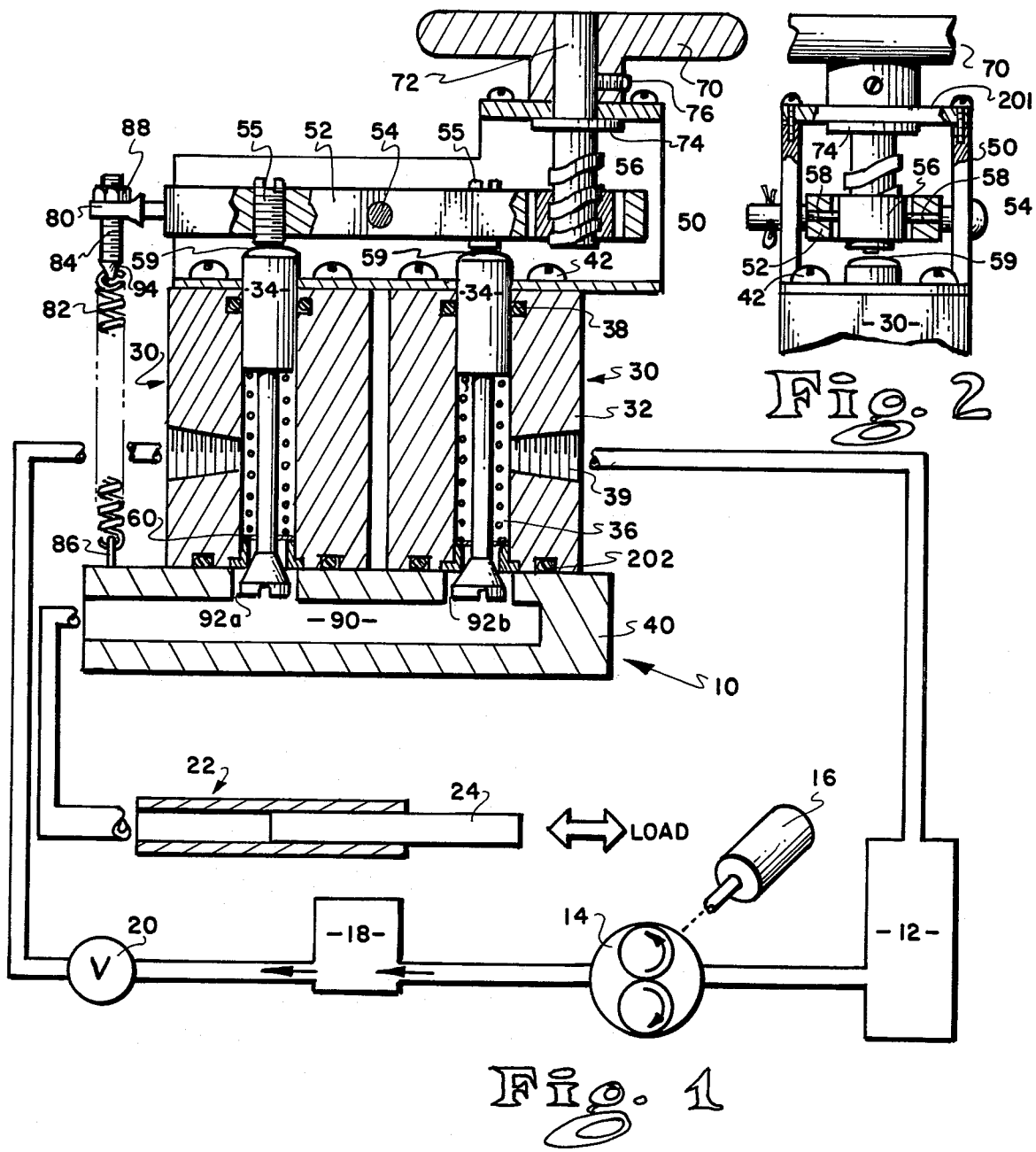
Fig. 1
Fig. 2
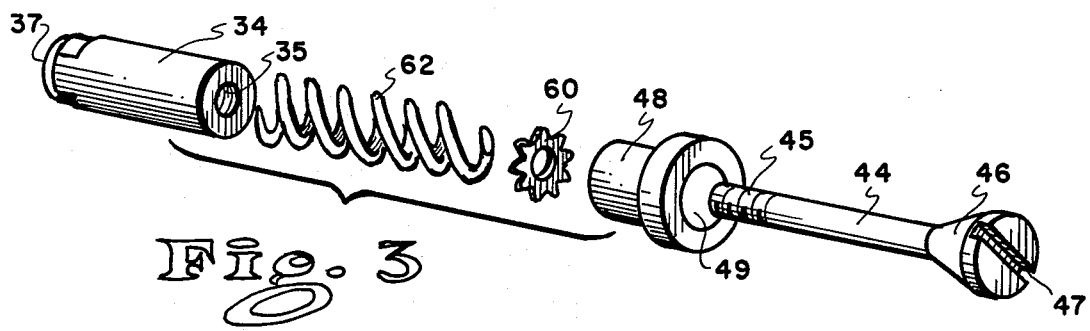
Fig. 3

FLUID CONTROL VALVE ASSEMBLY

BACKGROUND OF THE INVENTION

The invention relates to control valve assemblies for hydraulic or pneumatic actuators. It relates, more particularly, to control valve assemblies incorporating a pair of identical valves for controlling the admission of pressurized fluid to the actuator, and the discharge of fluid from the actuator, respectively, through the operation of an operator mechanism including a rocking beam.

The field of hydraulic positioning and control circuits is broad and the prior art includes many devices for controlling fluid-powered actuators by means of a pair of valves. Such valve assemblies of the prior art, while suitable for a wide range of control applications, fail to exhibit some highly desirable characteristics; the most prominent of which are:

The use of identical, separately replaceable control valves for the fluid admission and discharge functions;

The use of a common manifold for mounting these valves and for providing interconnection with the controlled actuator;

The use of single tappet (piston) means of sealing and providing additional closure forces within the valve proportional to fluid pressures.

The provision of operating means which selectively and unambiguously provide for the individual actuation of one of the two valves in the assembly, and also provide for a definite neutral position in which both valves are closed; and The provision of internal sound suppression means within the individual valves.

It is, therefore, the primary object of the invention to provide a control valve assembly for fluid-powered actuators which utilize individual and identical supply and discharge valves mounted to a common hydraulic manifold.

It is additional object of the invention to provide a fluid control valve assembly in which the paired control valves are operated by means of a rocking beam acting on protruding tappets in each valve.

It is also an object of the invention to provide control valves in which integral sound-suppression means are incorporated, in the form of serrated washers concentric with the valve stem.

It is yet another object of the invention to provide a control valve assembly which is economical in construction, reliable in operation, and simple to repair, inherently free from operator abuse, due to the fact that closure forces are mechanically determined.

SUMMARY OF THE INVENTION

The foregoing objects of the invention — and other objects and advantages which shall become apparent from the detailed description of the preferred embodiment thereof, below are attained in a control valve assembly mounted on a hydraulic manifold and including a pair of identical control valves and an operating mechanism.

Each of the pair of control valves includes a cylindrical bore in which a closely fitting cylindrical tappet is reciprocably located and provided with sealing means to prevent leakage of hydraulic fluid from the bore. The tappet protrudes from the valve body at the upper end thereof and mates with an elongated valve stem attached to the lower face of the tappet. The valve stem terminates in a downwardly expanding conical valve head.

A valve seat, provided with a circular orifice concentric with the bore, is inset into the valve body in such a manner that its lower circumferential edge zone provides a bearing seat for the conical valve head. A spiral compression spring is entrapped inside the bore, surrounding the valve stem, with its upper and lower ends bearing on the lower face of the tappet and the upper surface of the valve seat, respectively.

The lower face of the valve body is affixed to the hydraulic manifold and the valve seat therein communicates with a gallery in the manifold. Both valves communicate with the same gallery which is also interconnected with the controlled actuator. By means of the manifold the actuator can be interconnected to the high and low pressure sides of an external fluid power circuit by operating either valve. This connection is made through fluid ports opening into the bore of the two control valves, intermediate between the tappets and the valve seats, one valve being connected to the pressure source in the external system, the other to the fluid pump.

The control valves in the assembly are operated by means of a rocker beam superimposed on the protruding tappet portions and pivoted along an axis orthogonal to the bores of the valves and midway between them. Depressing one end of the rocker beam causes the valve nearer that end to be opened; depressing the other end of the beam opens the other valve and allows the first one to close. In a substantially horizontal position of the rocker beam a neutral control condition is obtained, with both valves closed and the actuator isolated from the external fluid circuit. An external adjustable spring acts on one end of the rocker beam in order to obtain exact preferential feel when actuating either valve.

Integral noise suppression is attained by including serrated washers in the valve assembly, in the flow path between the fluid port and the valve seat. These washers are passed over the valve stem, prior to its assembly to the tappet, and are pressed by the valve spring against the valve seat. One or more washers may be provided, and the washers themselves may be serrated on the outer circumference, or on the inner. In either type of serration a plurality of small flow channels are created, tending to reduce turbulence in the flow, and to create uniform conditions around the valve stem.

The control valve assembly of the invention may be readily constructed from all the materials conventional in the art of fluid control devices, and may be easily adapted to use with compressible and incompressible fluids. Sealing of the tappets against the bores, and of the base of the valve against the manifold body is readily accomplished by means of O-rings, although gaskets may also be employed in the latter location.

The operating mechanism of the rocker beam may be as simple as a handle extension of the beam itself, may employ rotating handwheels or handles whose motion is transformed into an angular displacement of the rocker beam by means of suitable cams, gears or threaded engaging components, or may be derived from some power actuator slaved to a remote controller.

The construction and mode of operation of the control valve assembly of the invention is described, below, with reference to the accompanying drawings, in which:

FIG. 1 is a partly schematic illustration of a fluid control system incorporating a control valve assembly of the invention, with the control valves and manifold associated therewith in frontal section;

FIG. 2 is a fragmentary, partly sectioned, view of the operating mechanism of the rocker beam of the embodiment of FIG. 1;

FIG. 3 is an exploded view of the internal components of one of the control valves in the valve assembly of FIG. 1; with externally serrated noise suppressing washer.

DESCRIPTION OF THE PREFERRED EMBODIMENT

Figure 4:
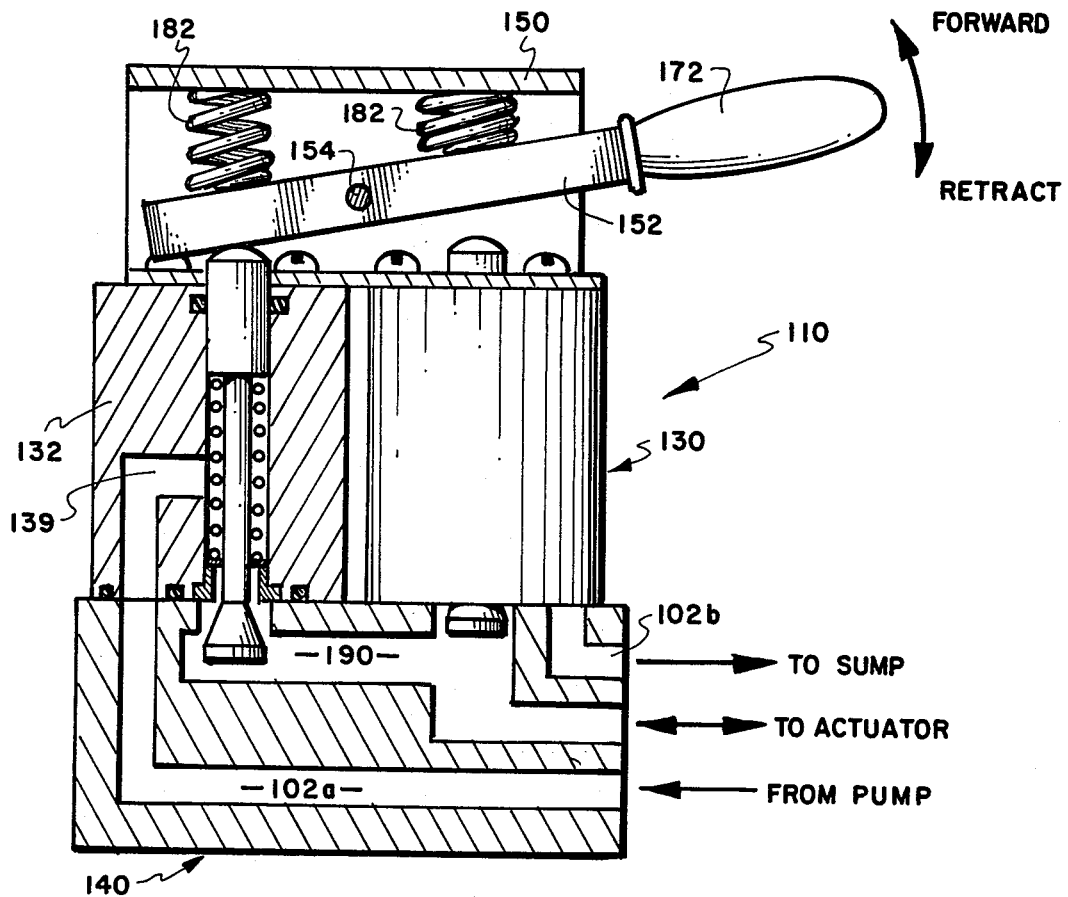
FIG. 4 is a frontal view, in partial section, of another embodiment of the control valve assembly of the invention.

The partly schematic illustration of FIG. 1 shows a sectioned view of a control valve assembly 10 and the major components of a hydraulic control system of which the assembly 10 forms part. The hydraulic system includes a sump, or reservoir, 12 for hydraulic fluid, a pump 14, with associated drive motor 16, a hydraulic accumulator 18 and a non-return valve 20. The function of the control system depicted in FIG. 1 is the supply of pressurized fluid to an actuator 22 whose ram resists and/or positions a load in response to the admission or drainage of fluid from the actuator.

Pressurized fluid is supplied to the actuator 22 from a hydraulic manifold 40, or, more properly, from a fluid gallery 90 within the manifold 40. Fluid may also be allowed to escape from the gallery 90, so that the ram 24 may be allowed to retract into the actuator 22 under the influence of the applied load.

The manifold 40 is an integral part of the fluid control valve assembly 10 and serves as the mounting base for a pair of identical hydraulic valves 30. One of these control valves is mounted onto the manifold 40 in such a manner that it controls the flow of fluid through an aperture 92a in the manifold; the other valve similarly controls flow through an aperture 92b. By means of the paired control valves 30 the apertures 92a and 92b are, respectively, in communication with the non-return valve 20 and the sump 12 and, consequently, with the high and low pressure ports of the hydraulic pump 14.

While the valves 30 serve different functions within the control valve assembly, and the overall hydraulic control system, their internal construction is identical and they are interchangeable with each other in all respects. Although if so desired different cone angles can be employed to alter opening rates in one valve or the other. The description, below, of the constructional details of one of the valves 30 is entirely applicable to the other valve.

The valve 30 is built up from a substantially rectangular body block 32 with an internal bore 36 and a pressed-in valve seat 48. The valve seat 48 is provided with a central opening 49 coaxial with the bore 36 but smaller in diameter. A reciprocating valve assembly is retained within the body 32, including — cylindrical tappet 34 — with a hemispherical head 37 at one end and a tapped bore 35 at the other — and a poppet valve with a cylindrical stem 44 and a conical valve head 46.

The valve stem 44 is provided with a threaded end portion 45 and mates with the tappet 34 by engaging the portion 45 in the threaded bore 35 of the latter. The assembly process requires that the several components be brought into the relative positions — with respect to the valve seat 48 — shown in the exploded view of FIG. 3, so that the valve stem 44 passes through the valve seat, prior to mating with the tappet. A valve spring 62 and a serrated washer 60 are also passed over the valve stem and are located between the tappet and the valve seat 48, with the washer 60 pressed against the upper surface of the valve seat by the spring reacting against the lower face of the tappet 34.

The valve spring forces the tappet in an upward direction, as viewed in the assemblies of FIG. 1, thereby pulling the conical valve head 46 into the lower edge zone of orifice 49 in the valve seat. The interaction of the conical valve head with the edge zone of the orifice creates a fluid-tight seal between the internal volume of the bore 36 and the gallery 90 in the manifold 40. A screwdriver slot 47 in the valve head 46 aids in the engagement of the valve poppet with the tappet. The tappet has flats on the sides at the domed end to secure it during assembly.

The cylindrical body of the tappet 34 is a sliding fit in the bore 36; a fluid-tight seal is established between the atmosphere and the bore by means of an O-ring seal 38, inset into a circumferential groove in the bore 36 in the region normally occupied by the tappet. A fluid passage 39 opens into the bore 36 below the tappet and allows the interconnection of the valve 30 with the external hydraulic system. The passage 39 is suitably provided with a female pipe thread to permit such an interconnection.

The individual valves 30 are assembled onto the manifold 40 by means of threaded fasteners 42; sealing of the interfaces against leakage is accomplished by means of O-ring seals 202 concentric with the bores 36 of the valves 30. Other sealing means may be substituted for the O-rings 202, and the manifold 40 may be made the carrier for such seals, as opposed to the valve bodies.

As evident from the foregoing description and from the illustration of FIG. 1, the valves 30 are normally closed and held in that position by the integral valve springs 62 and the fluid pressure acting against the tappets. To secure fluid flow through either valve 30 the tappet 34 associated therewith must be depressed — against the resistance of the valve spring and fluid pressure which generates a closure force due to the action of it upon the tappet. Upon closure more exactly the sealing force is a function of the difference between the tappet area and the valve head 46 area exposed by orifice 49 multiplied by the existing pressure in bore 36. The spring 62 provides added sealing force. Depressing tappet 34 allows valve head 46 to separate from the valve seat 48. For the operation of the valves 30, the assembly 10 incorporates a rocking beam 52, pivoted centrally between the adjacent valves 30 on a pivot pin 54 engaged in a bracket 50.

The rocking beam 52 forms part of an actuating assembly whose construction is shown in the frontal view of FIG. 1 and in the partial side view of FIG. 2. In both Figures portions of the rocking beam and some of the associated components are selectively sectioned to expose otherwise hidden components.

The bracket 50 is basically U-shaped and the base of the U is secured to the valve assembly 10 by means of the same fasteners 42 that hold the valves 30 to the manifold 40. The rocking beam 52 is held in a substantially horizontal position above the valve bodies 32 and the protruding hemispherical heads 37 of the tappets 34. The alignment of the central pivot pin 54 is such that the accurate motion of the rocking beam in either sense will bring the beam to bear on the tappet of one or the other of the valves 30; the actual contact is accomplished via the basal surfaces of setscrews 55 secured in threaded orifices passing through the rocking beam. The presence of the setscrews 55 allows for the adjustment of a gap 59 between their basal planes and the top of the tappets, thereby defining an adjustable 'dead zone,' motion through which does not result in valve actuation by the beam.

A pivoted nut 56 is inset into a pocket at one end of the rocking beam 52 and is engaged by mating threads on an operating shaft 72 which passes through the open portion of the U-shaped bracket 50 through bridge plate 201. The nut 56 is pivotally engaged to the rocking beam by means of pivot pins 58. The operating shaft 72 has an integral reaction collar 74 just below the bridge plate 201. That portion of the shaft protruding above the bridge plate is engaged by a handwheel 70 that secures the shaft 72 to the bridge plate, allowing for its rotation only. Rotation of the handwheel varies the penetration of the threaded portion of the shaft 72 into the nut 56, so that, the upper portion of the shaft 72 being axially fixed, the resulting motion is translated into a deviation of the rocker beam 52 from the horizontal and, depending on the sense of rotation of the handwheel, into the selective actuation of one of the valves 30 through contact with one of the setscrews 55. A detent mechanism, not shown for the sake of clarity of illustration, is also incorporated in the handwheel portion of the actuating device, providing a positive and selective indication of attainment of the neutral position of the rocking beam, corresponding to a closed condition of both valves 30 in the control 10.

In the embodiment of FIG. 1 a clockwise rotation of the handwheel 70 results in an elevation of the nut 56 and the consequent actuation of the valve associated with the manifold port 92a, thereby admitting pressurized fluid from the pump 14 into the actuator 22 and resulting in an increased travel of ram 24, outward from the actuator housing. Conversely, an anticlockwise rotation of the wheel 70 secures a condition in which fluid is drained from the actuator 22, via port 92b, into the sump of the hydraulic control system, allowing a retraction of the ram 24.

The sensitivity of the handwheel 70, as measured by the manual effort required to rotate it, may be adjusted by varying the load, imposed by a spring 82, on the rocking beam 52. This spring load provides adjustable means to obtain desired handwheel rotational resistance. This adjustment provides for exact feel even though a higher pressure exists in one valve over the other. The valve system without spring 82 would require greater torque clockwise on handwheel 70 than would be required anti-clockwise. The spring 82 is stretched between an anchor 86 secured to the manifold 40 and an anchor 84 passed through an eye 80 affixed to one end of the rocker beam. The hook 94 has a threaded shank which is engaged by a nut 88 reacting against the eye 80; the nut 88 serves as the adjusting means for the tensional load on the spring 82.

One of the problems generally encountered in hydraulic control valves is the generation of a substantial amount of noise due to the flow of fluid through the internal passages. This problem can be vital in certain applications, such as hydraulic control systems for — or used around — sound recording equipment, and in submarines which must appear as nearly noiseless as possible to 'sonar' detecting devices.

The valve of the invention is preferentially equipped with integral noise suppresssion devices in the critical area of the valve stem inside the bore 36. The serrated washer 60, shown in FIG. 3 and, entrapped between the spring 62 and the valve seat 48, in FIG. 1, serves such a noise suppression function. By channeling the flow of hydraulic fluid through a multiplicity of small, parallel flow passages, the washer 60 tends to promote uniformity of turbulence in the fluid and causes an observable reduction of emitted noise.

A control valve assembly 110, shown in FIG. 4, represents an alternate embodiment of the fluid control device of the invention. The valve assembly 110 incorporates two identical hydraulic valves 130, mounted on a common manifold 140 and operated by means a rocker beam 152 with integral handle 172.

The construction of each of the control valves 130 is similar to that of the valves 30 in FIG. 1, with two minor differences. The one change accomodates the valve 130 to direct mounting onto the manifold 140 by providing a fluid channel 139 in place of the passage 39 of the valve 30. The channel 139 opens in the lower face of the valve 130 and communicates with a gallery 102a, or 102b, depending on the particular location of the valve on the manifold, allowing for the supply and drain connections to be made to the manifold, rather than to the valve body.

Figure 5:
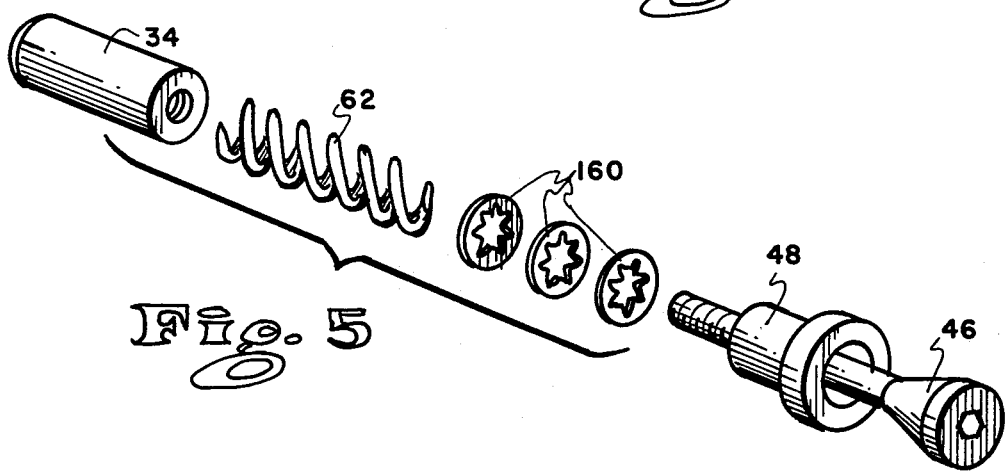
FIG. 5 is an exploded view of the internal components of a control valve in the embodiment of FIG. 4, incorporating internally serrated washers for the integral noise suppression function.

Another charge is illustrated in the exploded view of the internal valve components in FIG. 5 and concerns the substitution of three internally serrated washers 160 for the externally serrated washer 60 of the embodiment of FIG. 1. The washers 160 perform the same function of internal noise reduction as the single washer 60.

The rocker beam 152 is pivotally secured in a bracket 150 affixed into the assembly above the valves 130 by means of a pivot pin 154 affixed to the bracket 150. The pivot pin 154 is centrally located between the pair of valves 130, so that an elevation or depression of the control handle 172 will result in the selective depression of one of the tappets 34 in the valves 130. The rocker beam 152 is maintained in the neutral — or horizontal — position by means of a pair of matched springs 182 reacting against an upper flange of the bracket 150. The springs 182 also serve as additional force-feedback elements, tending to oppose the motion of the rocker beam into either operating position.

The embodiments of FIGS. 1 through 3, and of FIGS. 4 and 5, respectively, share the salient features of the control valve assembly of the invention: The use of a common manifold for fluid communication with the controlled actuator element, and for mounting a pair of interchangeable valve cartridges; the use of such identical valve cartridges for both the supply and discharge modes of the valve assembly; the use of a rocking beam, operated by means of a reversible manual control, for the selective opening of the individual valve elements; the use of conical valve heads seated on circular valve seats in the valve cartridges; the presence of serrated washers entrapped on the valve stems for noise suppression, and the use of tappets to both seal against fluid escape and providing for closure and sealing forces.

Changes in the detailed construction and arrangement of the several components of the control valve assembly are possible, and may suggest themselves to one skilled in the art upon exposure to the teachings herein, without affecting the basic principles and operation of the valve assembly, as described hereinabove. Such changes are deemed to be encompassed by the disclosure, the invention being delimited only by the appended claims.

I claim:

1. A control valve assembly for controlling the admission and discharge of fluid to, and from, fluid-powered actuator means, comprising:

a pair of identical control valves, with each of said valves including a cylindrical bore passing through a valve body, a cylindrical tappet reciprocable in one end of said bore and protruding therefrom, sealing means between said bore and said tappet to prevent egress of fluid from the bore, a valve seat provided with a circular channel coaxial with said bore inset into the other end of the bore, a conical valve head removably secured to said tappet by means of an elongated valve stem, and resilient spring means entrapped in said bore between said tappet and said valve seat for urging said valve head into fluid-sealing contact with said channel;

fluid manifold means in communication with said other end of the bore of each of said pair of control valves said fluid manifold means having an inlet/outlet means for communicating with a fluid-powered actuator means;

fastener means, for securing said pair of control valves to a surface of said manifold means;

valve actuating means, including a carrier member secured to at least one of said valve bodies, a rocking beam pivotably secured to said carrier member and superimposed above the protruding portions of said tappets in said valves, and operating means for controllable pivoting of said rocking beam from a neutral position equally spaced from both of said tappets into bearing contact with either tappet; and fluid port means communicating with said bore in each of said control valves, intermediate between said tappet and said valve seat, adapted to interconnect one of said valves with a source of pressurized fluid and the other of said valves with a sink for fluid, whereby, by selective pivoting of said rocking beam through said operating means, said actuating means may be placed in communication with either said source or said sink.

2. The control valve assembly of claim 1, further comprising:

noise suppression means, including at least one serrated washer having an internal orifice concentrically surrounding said valve stem said washer being entrapped between said resilient spring means and said valve seat in the bore of each of said control valves.

3. The control valve assembly of claim 2, wherein at least one of said washers is serrated on the outer periphery thereof.

4. The control valve assembly of claim 2, wherein at least one of said washers is serrated on the internal orifice thereof.

5. The control valve assembly of claim 1, wherein said operating means include:

an internally threaded nut, pivotably secured to said rocking beam at a position spaced from the pivot axis of said beam with respect to said carrier member;

a handwheel, and a threaded shaft affixed to said handwheel, rotatably secured to said carrier member and with said threaded shaft engaged in said internally threaded nut, whereby the rotation of said handwheel induces reciprocating motion of the nut along said shaft and results in an accurate displacement of said rocking beam around said pivot axis.

6. The control valve assembly of claim 1, wherein said operating means additionally include adjustable damping means.

7. The control valve assembly of claim 1, wherein said fluid port means communicate with fluid galleries in said fluid manifold means.

8. The control valve assembly of claim 1, wherein said protruding portions of said tappets are formed into convex surfaces substantially approximating hemispheres.

9. The control valve assembly of claim 1, wherein said valve actuating means additionally includes clearance adjusting means, for adjusting said spacing of said rocking beam from said tappets in the neutral position of the rocking beam.

* * * * *